(12) United States Patent
Yokoyama et al.

(10) Patent No.: US 6,699,927 B2
(45) Date of Patent: Mar. 2, 2004

(54) MOLDING COMPOSITION CONTAINING A DEBINDING CATALYST FOR MAKING CERAMIC MICROSTRUCTURES

(75) Inventors: Chikafumi Yokoyama, Tokyo (JP); Takaki Sugimoto, Tokyo (JP); Chi-Hing Chiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 354 days.

(21) Appl. No.: 09/941,122

(22) Filed: Aug. 28, 2001

(65) Prior Publication Data

US 2002/0007000 A1 Jan. 17, 2002

Related U.S. Application Data

(62) Division of application No. 09/427,234, filed on Oct. 26, 1999, now Pat. No. 6,306,948.
(51) Int. Cl.$^7$ .................................................. C08K 3/34
(52) U.S. Cl. ........................ 524/492; 524/493; 524/497
(58) Field of Search ................................. 524/492, 493, 524/497

(56) References Cited

U.S. PATENT DOCUMENTS

| | | | |
|---|---|---|---|
| 4,026,714 A | 5/1977 | Lewis | |
| 4,554,259 A | 11/1985 | Franklin et al. | |
| 4,617,279 A | 10/1986 | Manabe et al. | |
| 4,627,160 A | 12/1986 | Herron et al. | |
| 4,640,900 A | 2/1987 | Kokubu et al. | |
| 5,714,840 A | 2/1998 | Tanabe et al. | |
| 5,840,465 A | 11/1998 | Kakinuma et al. | |
| 5,853,446 A | 12/1998 | Carre et al. | |
| 5,854,152 A | 12/1998 | Kohli et al. | |
| 5,854,153 A | 12/1998 | Kohli | |
| 6,023,130 A | 2/2000 | Sakasegawa et al. | |

FOREIGN PATENT DOCUMENTS

| | | |
|---|---|---|
| EP | A-0 802 170 | 10/1997 |
| EP | 0836892 | 4/1998 |
| EP | 0855731 | 7/1998 |
| FR | 2 738 393 | 3/1997 |
| WO | WO 99/60446 | 11/1999 |

*Primary Examiner*—Edward J. Cain
(74) *Attorney, Agent, or Firm*—Robert J. Pechman

(57) ABSTRACT

A molding composition is provided that includes an inorganic component, an organic binder component, and a debinding catalyst. The molding composition is capable of lowering the sintering temperature, for example, when the molding composition is used to make ceramic microstructures such as barrier ribs for plasma display panels.

10 Claims, 6 Drawing Sheets

MOLDING COMPOSITION CONTAINING A DEBINDING CATALYST FOR MAKING CERAMIC MICROSTRUCTURES

This application is a Division of Ser. No. 09/427,234 filed Oct. 26, 1999, now U.S. Pat. No. 6,306,948.

TECHNICAL FIELD

The present invention generally relates to molding compositions, particularly moldable inorganic compositions, and to making ceramic microstructures such as plasma display panel barrier ribs using inorganic molding compositions.

BACKGROUND

Plasma display panels (PDP) include a pair of glass flat panels arranged parallel to each other and spaced a distance apart via barrier ribs. The barrier ribs are also arranged to form partitions between the glass panels that can contain an inert gas (e.g., neon, helium, xenon). The partitions are used in part to form a grid of discharge cells corresponding to pixels or sub-pixels in the plasma display that can be individually activated when an electric field is applied across a cell. The electric field excites the inert gas, which gives off ultraviolet radiation that irradiates a phosphor material contained within the cell to in turn give off visible light.

Commonly, PDP barrier ribs are formed using a composition containing an inorganic component, such as glass or ceramic material, and an organic component, such as a curable organic binder. Such compositions can be used to make barrier ribs by employing various techniques including mask-based techniques such as photolithography or sandblasting, screen printing techniques, and direct molding techniques.

When making barrier ribs using compositions that contain glass or ceramic material in an organic binder, it may be desirable to initially form the ribs by curing or otherwise hardening the organic material and then to remove the organic binder component from the ribs by sintering. In the case of many barrier rib compositions, the organic binder component contained therein is capable of forming a polymer compound as a result of curing or hardening. The organic binder component can then subsequently be removed from the ribs by thermal decomposition during sintering. To remove the organic components, sintering can be carried out at relatively high temperatures (e.g., 550° C. to 650° C.) for relatively long period of time (e.g. 30 minutes to 1 or more hours). In general, the higher the sintering temperature, the more likely it is for the panel substrate to warp, shrink, or otherwise distort during processing.

In some PDP rib fabrication processes, it may also be desirable to remove one or more organic additives other than the binder component that may be contained in the rib composition prior to the sintering step that burns out the binder. Additional removal steps generally require additional heating cycles for additional amounts of time, and each heating cycle generally requires temperature control. This can greatly reduce the efficiency of the rib fabrication process.

SUMMARY OF THE INVENTION

According the present invention, there can be provided a molding composition suitable for making ceramic microstructures (such as PDP barrier ribs) at comparatively low sintering temperatures. Using a molding composition of the present invention in a process of making ceramic microstructures on a glass panel substrate can reduce the likelihood of warpage, distortion, shrinkage, or other types of deformation of the glass substrate. The use of a molding composition according to the present invention can also increase the efficiency of a ceramic microstructure fabrication process by reducing the number of heating cycles, especially when multiple organic components can be removed at the same relatively low temperature.

It is another object of the present invention to provide a substrate for plasma display panels using a molding composition in accordance with the present invention to mold barrier ribs onto glass substrates.

It is still another object of the present invention to provide a method of producing barrier ribs on a glass substrate for plasma display panels.

In one embodiment, the present invention provides a molding composition that includes a glass or ceramic powder; an organic binder component capable of being hardened by exposure to heat, light, or an electron beam; and a debinding catalyst of the organic binder component, the debinding catalyst being a transition metal oxide, salt, or complex. The molding composition has a sintering temperature that is at most about 500° C., and the presence of the debinding catalyst in the molding composition enables the use of lower sintering temperature ceramic formulations.

In another embodiment, the present invention provides a plasma display panel. The plasma display panel includes a glass panel having a plurality of barrier ribs formed thereon. The barrier ribs are formed using a molding composition that contains an inorganic component including a glass or ceramic powder, an organic binder component capable of being hardened by exposure to heat, light, or an electron beam, and a debinding catalyst of the organic binder component, the debinding catalyst comprising a transition metal oxide, salt, or complex, wherein the molding composition has a sintering temperature that is at most about 500° C., and wherein the presence of the debinding catalyst in the molding composition enables the use of lower sintering temperature ceramic formulations.

In another embodiment, the present invention provides a method of making barrier ribs for a plasma display panel, which includes the steps of placing a molding composition between a mold having a plurality of concave portions and a glass panel, hardening the molding composition between the mold and the glass panel to form precursor barrier ribs, removing the mold from the precursor barrier ribs, and sintering the precursor barrier ribs on the glass panel by heating to a temperature of about 400° C. to 500° C. The molding composition contains an inorganic component including a glass or ceramic powder, an organic binder component capable of being hardened by exposure to heat, light, or an electron beam, and a debinding catalyst of the organic binder component, the debinding catalyst comprising a transition metal oxide, salt, or complex, wherein the molding composition has a sintering temperature that is at most about 500° C., and wherein the presence of the debinding catalyst in the molding composition enables the use of lower sintering temperature ceramic formulations.

DETAILED DESCRIPTION

Figure 1:
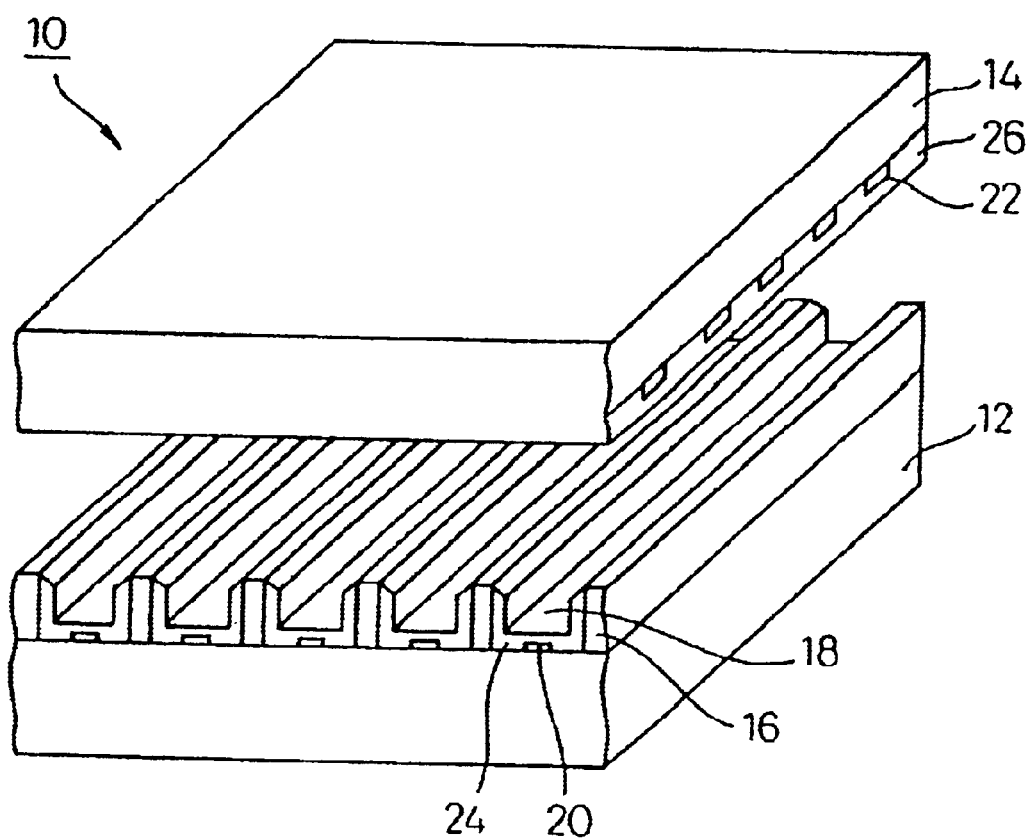
FIG. 1 represents a partially cutaway perspective view showing a PDP substrate.

FIG. 1 schematically shows a PDP substrate 10 that has a front panel 14, a set of front transparent electrodes 22, an optional transparent dielectric coating layer 26 disposed over front electrodes 22, a back panel 12, a set of back electrodes 20, a set of barrier ribs 16 forming a plurality of discharge display cells 18, and fluorescent layers 24 formed in the discharge display cells 18.

Front and back panels 14 and 12 are typically transparent glass flat panels. For example, the front and back panels can be composed of conventionally available soda-lime glass. As discussed in more detail below, using a molding composition of the present invention can result in less severe processing conditions that in turn can allow the use of less expensive glass panels such as high distortion soda-lime glass. The front panel 14 can be configured relative to the back panels 12 so that the surfaces of the panels having the front electrodes 22 and back electrodes 20 respectively are facing each other with the electrode stripes crossed to form an array of pixels areas. Between the back panel 12 and front panel 14, a plurality of barrier ribs 16 are provided to partition the display panel into a plurality of discharge display cells 18. Barrier ribs 16 generally contain a glass or ceramic material. In each discharge display cell 18, an address electrode 20 can be provided. Address electrodes 20 can be made of any suitable conductive material and need not be transparent. The fluorescent material 24 is typically comprised of phosphor materials that give off a color of visible light when exposed to ultraviolet radiation. By arranging different phosphor materials that give off different primary colors of visible light, a full color display can be made. On front panel 14, transparent bus electrodes 22, typically made of a transparent conductive oxide such as indium tin oxide (ITO), are provided as indicated above. In addition, an optional transparent dielectric layer 26 can be coated over the bus electrodes 22, for example, to protect the electrodes from possible sputter damage during operation of the PDP and extend the life of the display.

To complete the discharge cells, the panels can be bonded together, and a discharge gas (e.g., neon, helium, xenon, or other inert gas) can be confined in the spaces between the panels. By applying an electric field across a pair of address electrodes 20 and bus electrodes 22, the discharge gas can be made to emit ultraviolet radiation which in turn excites the fluorescent materials, thereby making it possible to emit visible light by discharge.

The barrier ribs that are provided to partition off the space between the back panel and front panel can be formed from a molding composition that contains a glass or ceramic material in an organic binder that can be cured by exposure to heat or radiation (such as ultraviolet light, electron beam, etc.). The barrier ribs are commonly formed so that they are integrally bonded to at least one of the back panel or front panel.

The molding composition of the present invention contains an inorganic component (such as a glass or ceramic powder), an organic binder component, and a debinding catalyst. The inorganic component is generally composed of a glass or ceramic component, preferred components including aluminum oxides, silicon oxides, titanium oxides, zirconium oxides, and other like materials. A suitable molding composition contains an inorganic component in an amount of about 20% or greater by volume, an organic binder component in an amount of about 80% or less by volume, and a debinding catalyst in an amount of about 5% or less by volume. Another suitable molding composition contains an inorganic component in an amount of about 40% or greater by volume, an organic binder component in an amount of about 60% or less by volume, and a debinding catalyst in an amount of about 5% or less by volume. Yet another suitable molding composition contains an inorganic component in an amount of about 45% or greater by volume, an organic binder component in an amount of about 55% or less by volume, and a debinding catalyst in an amount of about 2% or less by volume.

The organic component of the molding composition is generally used as a binder vehicle for initially shaping the barrier ribs, for example using a mold, and for allowing the molded shapes to be hardened, for example by curing. Preferred examples of the organic binder component include, but are not limited to, bisphenol A diglycidyl ether (meth)acrylic acid adduct, other acrylic acid adducts, ethylene glycol dimethacrylate, diethylene glycol dimethacrylate, triethylene glycol dimethacrylate, or the like. Such an organic binder component may be cured by irradiation with ultraviolet light, an electron beam, or other suitable methods. The resulting cured composition generally forms a three-dimensional network of inorganic material dispersed within a polymer matrix. In such a form, the glass or ceramic materials can be contained within the organic binder matrix in a relatively uniform fashion. A cure initiator can also be included in the organic binder component. For example, a cure initiator can be chosen that has an absorption edge at a wavelength that is substantially transparent to the mold used and/or to the display substrate.

A particularly well suited organic binder in the molding composition of the present invention is made of a mixture of bisphenol A diglycidyl ether methacrylic acid adduct and triethylene glycol dimethacrylate. Such an organic binder can impart sufficient strength to the molded article after curing (barrier rib precursor), and can often be removed upon sintering without causing cracking or other such defects in the molded article.

For organic binder components composed of a silane coupling agent having a (meth)acrylic group, a network containing and retaining the ceramic component can be formed of silicon dioxide having a comparatively high melting point after sintering. Such a network can be substantially retained as long as the heating temperature remains below the melting point of silicon dioxide. Accordingly, substantial changes in the volume of the molded barrier ribs before and after the sintering can be avoided, thereby reducing the change of defects due to relatively large dimension changes upon sintering. Examples of silane coupling agents suitable for use in the organic binder component include γ-methacryloxypropyl methyl trimethoxysilane, γ-methacryloxypropyl methyl dimethoxysilane, γ-methacryloxypropyl triethoxysilane, and γ-methacryloxypropyl methyl diethoxysilane.

For a molding composition of the present invention that contains a silane coupling agent, it may be useful to include a mineral acid such as hydrochloric acid, nitric acid, or the like. The inclusion of a mineral acid can contribute to hydrolysis of the silane coupling agent, thereby making it possible to convert this composition into a sol. Such a sol-like composition does not generally gel upon drying, and thereby makes it possible to better disperse the ceramic or glass components.

The organic binder of the molding composition of the present invention can also contain a cure initiator. Examples of suitable cure initiators for photocurable compositions include, but are not limited to, aminoketone, bisacylphosphine oxide, camphorquinone, metallocene hydroxyketone, and benzyl dimethyl ketal. These or similar compounds are commercially available as cure initiators from Ciba-Geigy Co. under the Irgacure family of trade designations (e.g., Irgacure 651, Irgacure 184, Irgacure 500, Irgacure 1000, Irgacure 2959, Irgacure 907, Irgacure 369, Irgacure 1700, Irgacure 149, Irgacure 1850, Irgacure 819, and Irgacure 784), and under the Dalocure family of trade designations (e.g., Dalocure 1173).

The present invention does not preclude using an organic binder component that is not sensitive to radiation. For example, cellulose polymers, butadiene-styrene copolymers, polyamides, polyethers, or the like can be used.

A powdered or granular glass or ceramic material is preferably contained in the inorganic component of a molding composition of the present invention. It is generally desirable to form barrier ribs that have dense structures after sintering (e.g., structures that are substantially free of large pores). Using finely powdered or granulated ceramic or glass can help in dispersing the inorganic component throughout a network within the organic binder to give a relatively dense arrangement of inorganic components in the molded barrier rib precursor. Upon sintering to remove the organic components, relatively dense and strong barrier ribs can thus be formed. When using the glass component in combination with a silane coupling agent as the organic binder component, the strength of the rib can be enhanced by using a comparatively small amount of glass component, such as 10% to 70% by volume, preferably 20% to 50% by volume.

The glass component used herein is not specifically limited, and can be appropriately selected according to the type of glass used in the display panel and the organic binder component that is used. When the glass panel is made, for example, of soda-lime glass having a cooling point of about 550° C., an exemplary glass or ceramic powder is one that has a softening point of about 450° C. to 550° C. Glass or ceramic components that have relatively low softening points are typically made from lead-based glass containing, for example, boron, zinc, phosphoric acid, titanium, or a combination thereof in a predetermined amount. Other inorganic powders having low softening points can be made from aluminum phosphate glass, boron-titanium glass, bismuth glass, or zinc glass. Other low temperature formulations are discussed in co-assigned U.S. patent application Ser. No. 09/221,007, the disclosure of which is wholly incorporated into this document. When the organic binder component includes a silane coupling agent as described above, boron, zinc, phosphoric acid, titanium, or a combination thereof are preferably contained in the organic binder component to reduce the mass absorption coefficient of curing radiation so as to reduce the time of photocuring of the rib precursor.

In the molding composition of the present invention, the glass or ceramic component preferably has a softening point that is at least somewhat higher than the burn-out temperature of the organic binder component. When using such a glass component, it is possible to avoid difficulties that can occur when the glass or ceramic component becomes molten prior to complete removal of the organic binder component. If the glass or ceramic component becomes molten before complete removal of the organic component during sintering, portions of the organic component can become trapped in the barrier ribs.

According to the present invention, a debinding catalyst may also be contained in the molding composition. Exemplary debinding catalysts include oxides, nitrates, sulfates, or other oxidizers that are capable of generating sufficient oxygen during sintering to promote binder burn out at or below 500° C. The debinding catalyst is commonly made of an oxide, salt, or complex of transition metals such as chromium (Cr), manganese (Mn), iron (Fe), cobalt (Co), nickel (Ni), copper (Cu), zinc (Zn), indium (In), tin (Sn), ruthenium (Ru), rhodium (Rh), palladium (Pd), silver (Ag), iridium (Ir), platinum (Pt), gold (Au) or cerium (Ce). Specific examples include $Cu_2O$, $CuSO_4$, $Co(NO_3)$, and $Cu(OAc)_2$. Inclusion of a debinding catalyst can reduce the burn-out temperature of the organic component to help facilitate more complete removal of the organic materials from barrier ribs at lower temperatures. For example, in molding compositions of the present invention containing debinding catalysts, the sintering temperature can be lowered to about 400° C. to 500° C. from temperatures of about 500° C. to 550° C. for otherwise identical molding compositions that do not contain a debinding catalyst. This can be especially useful when it is desired that the glass or ceramic component has a softening point higher than a sintering temperature because a wider range of low softening temperature inorganic components can be used to similar effect. A decrease in sintering temperature can also help inhibit thermal deformation (e.g. warpage, distortion, or shrinkage) of the glass panel during processing and allow for high distortion, lower cost glass panels to be used.

In studies of thermal deflection of glass panels, it has been shown that soda-lime glass panels having widths of 5 mm and thicknesses of 2.8 mm deflect 5 μm to 25 μm at 550° C. or 500° C. when a load of 137 g is applied to the glass panel, whereas deflection hardly occurs at 460° C. when a load of 137 g is applied. It has also been shown that the amount of isotropic thermal shrinkage of the glass panel at 550° C., 500° C., and 460° C. is 400 parts per million (ppm), 225 ppm, and 125 ppm, respectively. It has also been shown that, for glass panels formed from high distortion glass (e.g., glass which is commercially available under the trade designation PD200 from Asahi Glass Co.), ,he amount of isotropic thermal shrinkage of the glass panel at 550° C., 500° C., and 460° C. is 200 ppm, 75 ppm, and 30 ppm. Using molding compositions of the present invention, the sintering temperature can be lowered to 500° C. or less, thereby reducing (and possibly greatly reducing) distortion of the glass panel during processing, even for high distortion soda-lime glass panels.

Referring now to FIG. 2, a method of producing a substrate for PDPs will be described. FIGS. 2(A) through (E) represent various steps in a method of producing a PDP substrate. First, a mold 30 having a concave portion 28 substantially corresponding to the desired shape of a barrier rib can be prepared as shown in FIG. 2(A). Preferably, the mold 30 is formed by polymerizing a photocurable component such as acrylic monomer or oligomer, monomer or oligomer of styrene, etc., in the presence of a photocuring initiator. In other words, the mold 30 can be obtained by molding off a master tool by the photopolymerization of the photocurable component. Accordingly, a cutting process is not required to produce mold 30. The photopolymerization reaction proceeds comparatively rapidly. In such way, mold 30 can be obtained easily in a short time, and many molds can be obtained off of a single master tool.

The mold 30 thus formed can be made flexible enough to allow removal of the mold from the cured (or otherwise hardened) barrier rib precursor and substrate, thereby reducing the likelihood of breakage of the ribs and base. Molds can also be formed that can be removed cleanly from the cured barrier rib precursors so that the molds can be repeatedly used without being washed. Examples of suitable molds for forming ceramic microstructures are described in co-assigned U.S. patent application Ser. No. 09/219,803, the disclosure of which is wholly incorporated into this document.

Figure 2A:
FIG. 2 represents cross-sectional views showing steps in a method of making PDP barrier ribs.
Figure 2B:
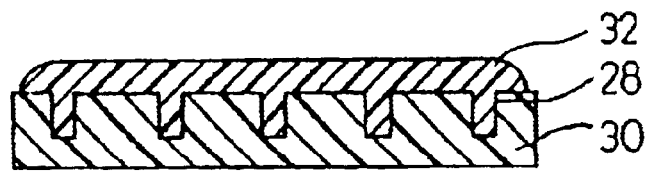

Referring again to FIG. 2, the next step is to provide a photosensitive (or otherwise curable) molding composition 32, such as that described in the present invention, and coat the molding composition 32 onto the mold 30, filling the concave portions 28 of the mold 30 as shown in FIG. 2(B). An exemplary molding composition 32 has a viscosity of about $1 \times 10^3$ to $1 \times 10^5$ centipoise (cps). When the viscosity of the molding composition is close to or within this range, filling of the mold with the molding composition can be conducted with high accuracy. A mineral acid such as hydrochloric acid, nitric acid, or the like may be contained in the molding composition, especially a molding composition containing silane coupling agents as the organic binder component. Mineral acids can be used to hydrolyze silane coupling agents, thereby converting such molding compositions into a sol that does not generally gel upon drying, thereby making it possible to better disperse the inorganic component of the ceramic component and glass component.

Figure 2C:
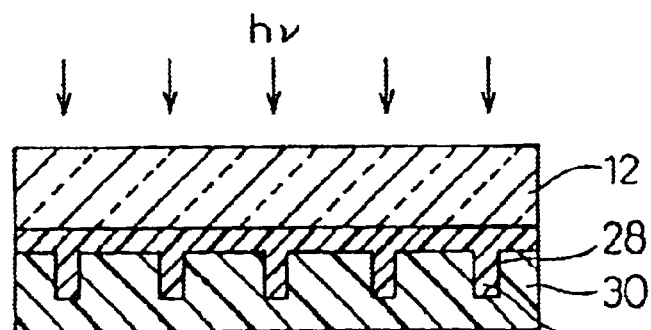

Next, a back panel 12 can be contacted with the molding composition 32 while the molding composition is in the mold 30, as shown in FIG. 2(C). When a flexible mold 30 is used, the mold and molding composition can be deflected and brought into contact with the back panel 12 at an angle, starting at one end of the back panel and finishing on the other end. For example, the mold and molding composition can be provided on the surface of a drum and brought into contact with the back panel via a rolling motion. In this manner, air pockets between the back panel 12 and the molding composition 32 are less likely to be formed. Similarly, after the molding composition has been hardened between the mold and the back panel, the mold can be removed by peeling, thereby increasing the likelihood of clean removal.

Next, the organic binder component can be cured or hardened, for example by irradiating the composition 32 with light (hv) as shown in FIG. 2(C). Curing radiation can be incident on the molding composition from the back panel side (as shown in FIG. 2(C)), from the mold side, or from both the back panel side and the mold side. Curing from the glass panel side can help the molding composition adhere better to the back panel, whereas curing from the mold side can better allow curing radiation to penetrate into the concave portions of the mold. Electron beam radiation, heat, or other methods can also be used to harden to the molding composition. The composition 32 is hardened while in contact with the back panel 12 and the mold 30 to obtain a molded article 34, also referred to as a barrier rib precursor.

Figure 2D:
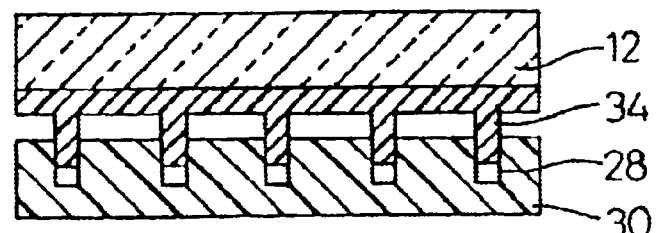

Next, the molded article 34 can be removed from the mold 30, thereby transferring the molded article 34 integrally to the back panel 12, as shown in FIG. 2(D). As mentioned above, molds can be used that reduce adhesion of the molded article 34 to the mold 30. Accordingly, such a removal can be conducted without causing significant breakage of the back panel 12 or molded article 34. In addition, the mold can be re-used.

Figure 2E:
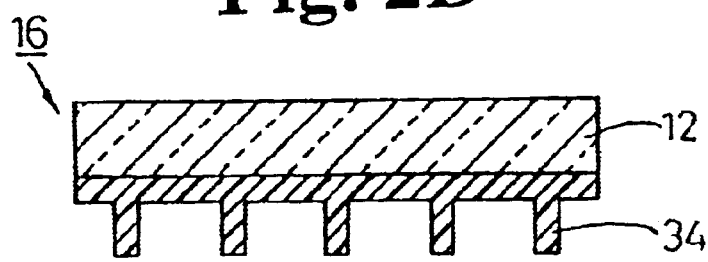

As a final step, the back panel 12 having the molded barrier rib precursors 34 adhered thereto can be placed in a sintering oven (not shown) and sintered at a predetermined temperature to burn out the organic components of the molded barrier rib precursors and obtain PDP back panel 16, as shown in FIG. 2(E). Using a molding composition as described in the present invention, sintering of the molded article 34 can be conducted at a temperature lower than a conventional sintering temperature by including a debinding catalyst molding composition 32. Accordingly, as described above, thermal deformation of the back panel 12 and shrinkage of the barrier ribs can be reduced. In this manner, it is possible to make barrier ribs that accurately replicate the shapes of the concave portions of the mold. In addition, the production method shown can be performed using. a single heating step, and as a result, difficult heat control steps can be kept to a minimum.

After processing of the barrier ribs, address electrodes may be formed between ribs on the back panel. Alternatively, address electrodes may be formed directly onto the glass back panel prior to forming the barrier ribs aligned with the electrodes. Fluorescent materials can then be deposited in the spaces between the barrier ribs. Then, a transparent front panel, on which a bus electrode has previously been formed, may also be disposed facing the back panel with the barrier ribs acting as spacers are partitions. The peripheral portions of the front panel and back panel may be sealed in an air-tight manner by using a sealing material (not shown), thereby forming a discharge display cells between the front panel and back panel. After evacuating the discharge display cells, a discharge gas may be introduced into the discharge cells to complete the PDP substrate.

While present invention has been described particularly with respect to making PDP barrier ribs using a molding composition described herein, the present invention contemplates using such molding compositions for making ceramic microstructures in general.

EXAMPLES

The present invention will now be described with reference to specific examples. It will be appreciated that the present invention is not limited to the following examples or the specific embodiments described therein.

Example 1

A photosensitive paste used for making a rib was prepared in the following procedure.

First, 10 g of a bisphenol A diglycidyl ether methacrylic acid adduct (manufactured by Kyoeisha Chemical Co., Ltd.) and 10 g of triethylene glycol dimethacrylate (manufactured by Wako Pure Chemical Industries Co., Ltd.) were mixed to obtain a photocurable organic binder component. After dissolving the organic binder component in 20 g of 1,3-butanediol (manufactured by Wako Pure Chemical Industries Co., Ltd.), 0.2 g of phosphate polyoxyalkyl polyol (POCA) and 0.1 g of bis(2,4,6-trimethylbenzoyl)-phenylphosphine oxide (as commercially available from Ciba-Geigy Co. under the trade name of Irgacure 819) were added to the resulting solution. Subsequently, 70 g of titanium oxide having an average particle diameter of 2 $\mu$m, and 2.5 g of cuprous oxide ($Cu_2O$) were mixed with the resulting solution to prepare a photosensitive composition.

Example 2

Using the photosensitive composition resulting from Example 1, barrier ribs were made in the following manner.

A mold having a concave portion corresponding to the desired rib shape was prepared, and the concave portion was filled with the photosensitive composition. Then, a transparent back panel was placed on the mold filled with the composition. A blue fluorescent lamp manufactured by Philips Co. was placed on the back panel and the composition was irradiated for 60 seconds with the light (which had wavelengths ranging from about 400 to 500 nm). The photosensitive composition was cured by light irradiation to form a molded article. The molded article integrated with the back panel was removed from the mold by peeling the mold from the back panel.

The resulting barrier ribs and back panel were then heated from room temperature to 800° C. at a fixed temperature rise rate of 10° C. per minute in air, and the weight loss of the rib was measured against the elapsed time during heating. The measurement results obtained are plotted in FIG. 3.

Figure 3:
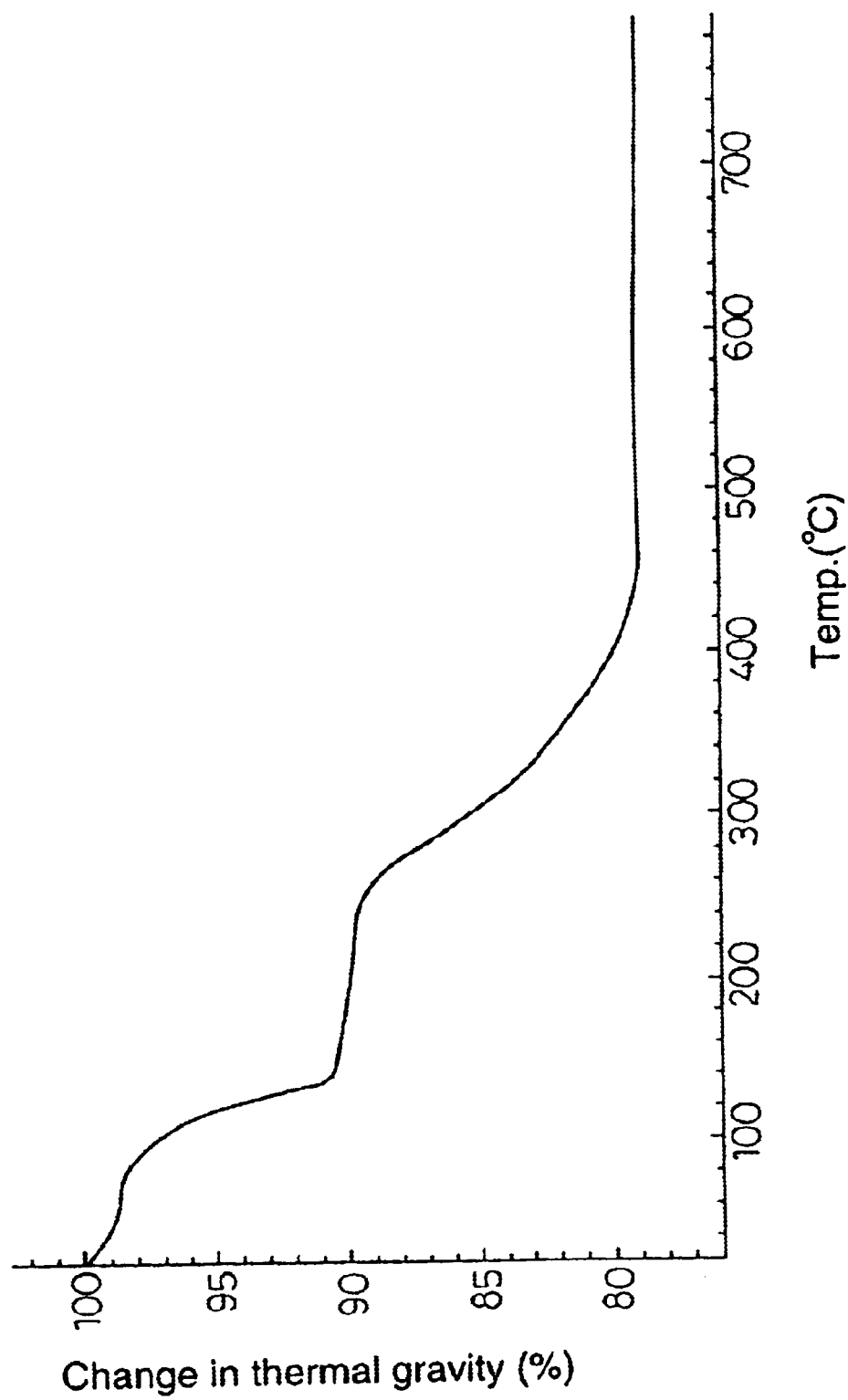
FIG. 3 represents a thermal gravimetric analysis plot of barrier ribs made according to Example 2.

As can be seen in FIG. 3, the measurement results show a large weight loss within the range from 100 to 150° C. It is considered that this weight loss is due to volatilization of volatile 1,3-butanediol. An additional change in weight started at about 260° C. and finished at about 440° C. It is considered that this weight loss is due to removal of the organic binder component as a result of burn out. Indeed, a significant change in weight was not observed during the remaining heating from 440 to 800° C. As a result, it is considered that removal of the organic binder component had been completed at about 440° C. In contrast, removal of the organic binder component when using an identical molding composition without the cuprous oxide was completed at about 490° C. using the same temperature ramp used in this experiment.

Example 3

The same procedure as in Example 1 was used to make a molding composition, except that 2.1 g of copper sulfate ($CuSO_4$) was used in this example in place of the 2.5 g of cuprous oxide used in Example 1. Barrier ribs were molded using this composition and a thermal gravimetric analysis was conducted in the same manner as in Example 2. The measurement results plotted in FIG. 4 were obtained.

Figure 4:
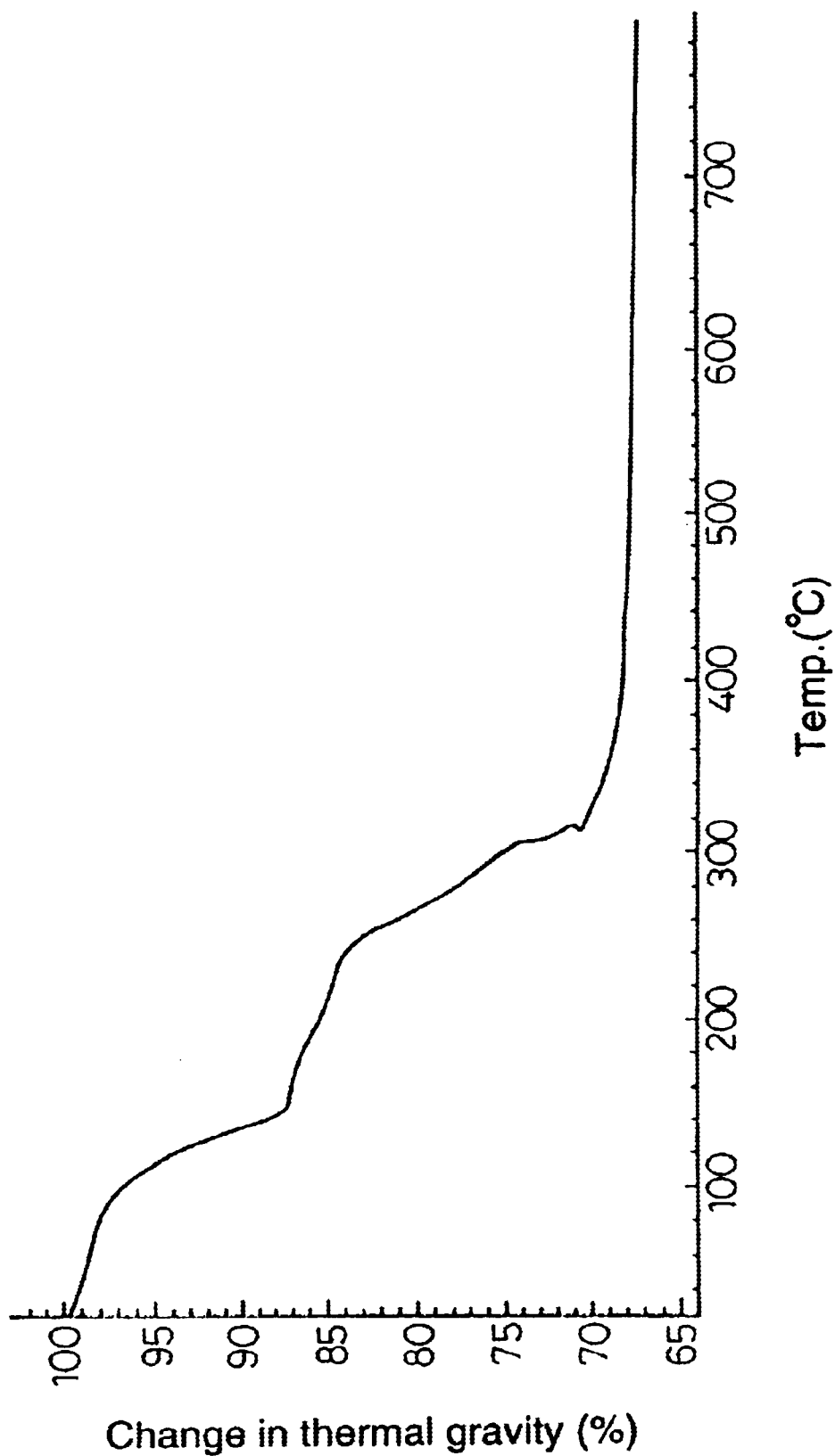
FIG. 4 represents a thermal gravimetric analysis plot of barrier ribs made according to Example 3.

As is apparent from the measurement results shown in FIG. 4, a large weight loss was observed within the range from 100 to 150° C. It is considered that this weight loss is due to volatilization of volatile 1,3-butanediol, as in Example 2. An additional change in weight was observed to initiate at about 260–300° C. and finish at about 400° C. It is considered that this weight loss is due to removal of the organic binder component as a result of burn out. Indeed, significant change in weight was not observed above 400° C. As a result, it is considered that removal of the organic binder component had been completed at about 400° C.

Example 4

The same general procedure as in Examples 1 and 2 was followed to make a photosensitive composition and barrier ribs, except that the molding composition was prepared according to the following procedure.

First, 24 g of γ-methacryloxypropylmethyl-dimethoxysilane (available from Nippon Yunicar Co.) was prepared as a silane coupling agent and 6 g of a mixed solution of an aqueous nitric acid solution and ethanol in a molar ratio of 2:1 was added to the silane coupling agent. The resulting mixture was reacted at 70° C. for 12 hours while stirring. After the completion of the reaction, the reaction product was dried at 70° C. and then the water and ethanol were volatilized.

To the remaining reaction product, 8 g of 2-hydroxyethyl methacrylate (manufactured by Wako Pure Chemical Industries Co., Ltd.), 8 g of 1,3-butanediol (manufactured by Wako Pure Chemical Industries Co., Ltd.), 0.1 g of a cure initiator sold under the trade designation Irgacure 819 by Ciba-Geigy Co., and 0.2 g of phosphate propoxylalkyl polyol (a surfactant), were added dropwise. Furthermore, 70 g of γ-alumina having an average particle diameter of 2.1 μm (sold under the trade designation A1-45-2, manufactured by Showa Denko Co.) and 3.5 g of cobalt nitrate, $Co(NO_3)$, were added.

Subsequently, barrier ribs were made from the resulting composition in the same manner as in Example 2. The resulting ribs were then heated from room temperature to 800° C. at a fixed temperature rise rate of 10° C. per 1 minute in air, and the weight loss was measured against the elapsed time during heating. The measurement results obtained are plotted in FIG. 5.

Figure 5:
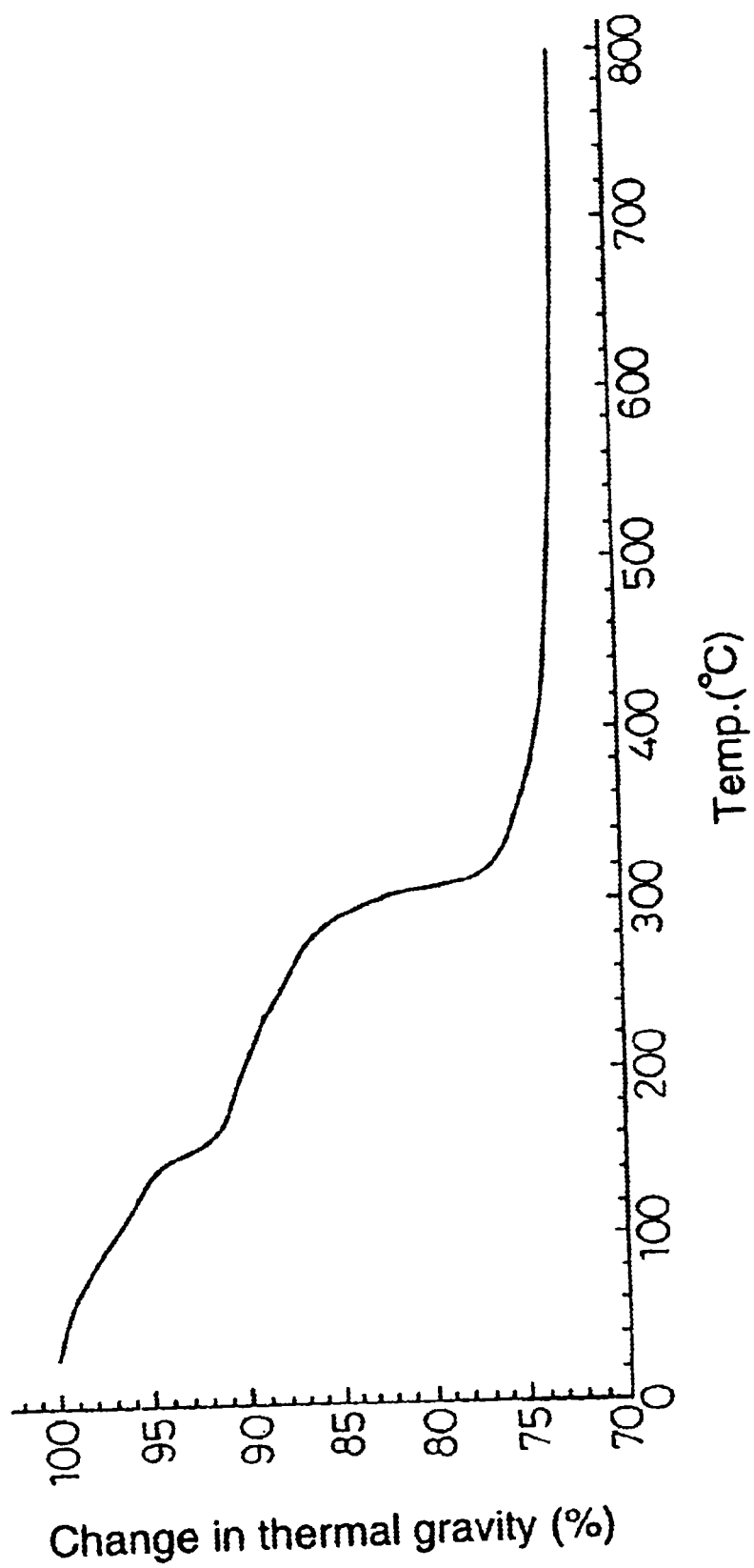
FIG. 5 represents a thermal gravimetric analysis plot of barrier ribs made according to Example 4.

As is apparent from the measurement results shown in FIG. 5, a large weight loss was observed within the range from 100 to 150° C. It is considered that this weight loss is due to volatilization of volatile 1,3-butanediol, as in Example 2. An additional change in weight was observed starting at about 280–320° C. and ending at about 460° C. It is considered that this weight loss was due to removal of the organic binder component as a result of burn out. In fact, the change in weight was hardly observed past 460° C. As a result, it is considered that removal of the organic binder component had been completed at about 460° C.

COMPARATIVE EXAMPLE

The same procedure as in Examples 1 and 2 was repeated, except that no oxidizing catalyst was used to form the photosensitive composition. Thus, the formulation of Example 1 was used without the $Cu_2O$. A thermal gravimetric analysis was conducted in the same manner as in Example 2 after molding barrier ribs as in Example 2. The measurement results obtained are plotted in FIG. 6.

Figure 6:
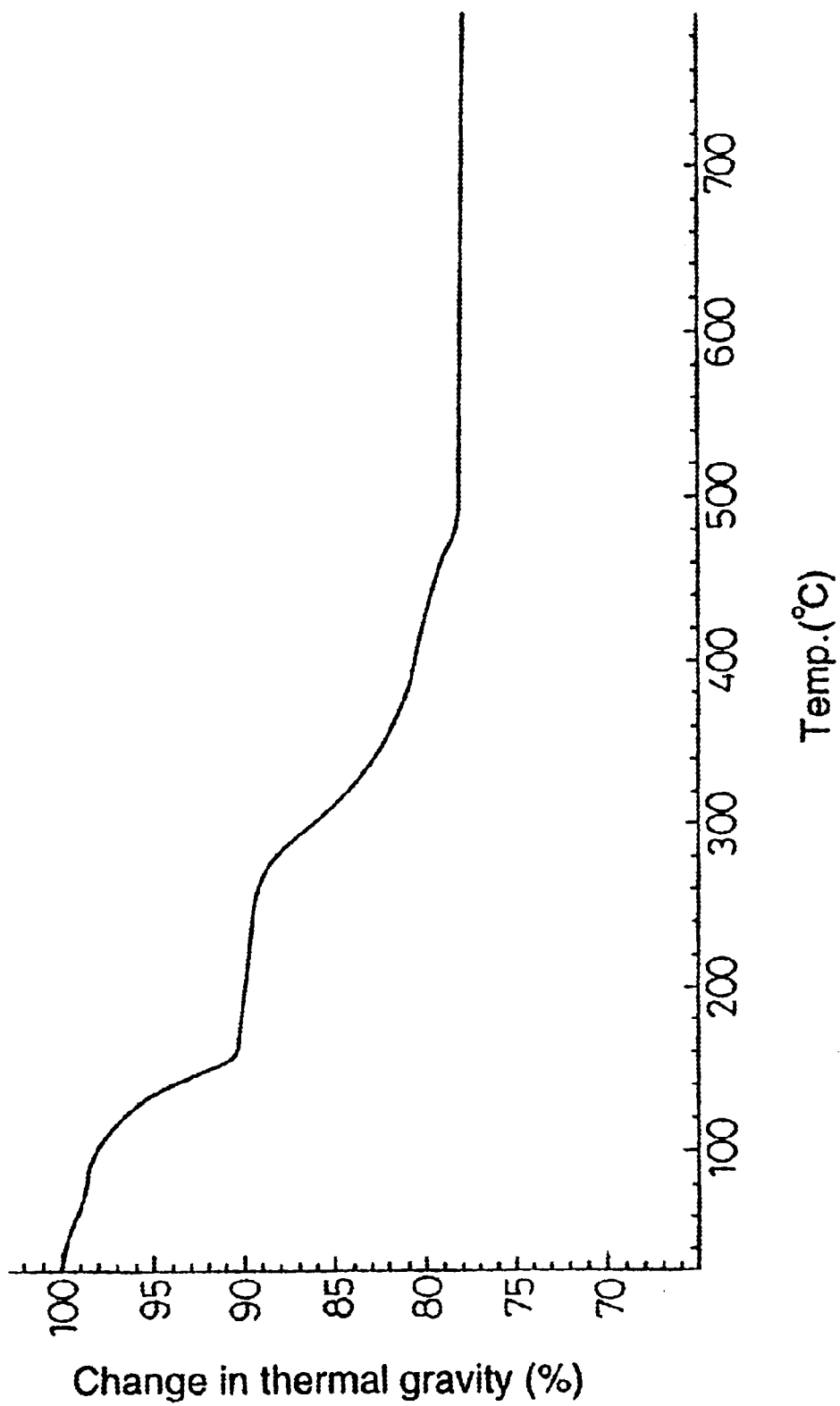
FIG. 6 represents a thermal gravimetric analysis plot of barrier ribs made according to the Comparative Example.

As is apparent from the measurement results shown in FIG. 6, a weight loss as a result of removal due to volatilization of 1,3-butanediol is observed at 100–150° C., similar to Examples 2–4 above. A change in weight as a result of removal due to burn-out of the organic binder component also initiated at about 260° C. In this comparative example, however, the weight changed continuously up to about 490° C., higher than for Examples 2–4.

These examples show that the addition of a debinding catalyst can be used to reduce the burn out temperature of the organic binder component of a barrier rib molding composing compared to the same molding composition without a debinding catalyst.

What is claimed is:

1. A plasma display panel, comprising a glass panel having a plurality of barrier ribs formed thereon, the barrier ribs formed using a molding composition comprising an inorganic component including a glass or ceramic powder, an organic binder component capable of being hardened by exposure to heat, light, or an electron beam, and a debinding catalyst of the organic binder component, the debinding catalyst comprising a transition metal oxide, salt, or complex, wherein the molding composition has a sintering temperature that is at most about 500° C., and wherein the presence of the debinding catalyst in the molding composition enables the use of lower sintering temperature ceramic formulations.

2. The plasma display panel of claim 1, wherein the glass panel comprises soda-lime glass.

3. The plasma display panel of claim 1, wherein the sintering temperature of the molding composition is at most about 460° C.

4. The plasma display panel of claim 1, wherein the sintering temperature of the molding composition is lower by about 50° C. or more in the presence of the debinding catalyst than for an otherwise identical molding composition without the debinding catalyst.

5. The plasma display panel of claim 1, wherein the debinding catalyst comprises an oxide, salt, or complex of Cr, Mn, Fe, Co, Ni, Cu, Zn, In, Sn, Ru, Rh, Pd, Ag, Ir, Pt, Au, or Ce.

6. The plasma display panel of claim 1, wherein the debinding catalyst comprises an oxide, salt, or complex of Cu.

7. The plasma display panel of claim 1, wherein the debinding catalyst comprises $Cu_2O$, $CuSO_4$, $Co(NO_3)$, or $Cu(OAc)_2$.

8. The plasma display panel of claim 1, wherein the molding composition further comprises a silane coupling agent.

9. The plasma display panel of claim 1, wherein the molding composition has a viscosity of about $1\times10^3$ to $1\times10^5$ centipoise.

10. The plasma display panel of claim 1, wherein the inorganic component is present in an amount of at least about 40% by volume, the organic binder component is present in an amount of at most about 60% by volume, and the debinding catalyst is present in an amount of at most about 5% by volume.

* * * * *

UNITED STATES PATENT AND TRADEMARK OFFICE
CERTIFICATE OF CORRECTION

PATENT NO. : 6,699,927 B2
APPLICATION NO. : 09/941122
DATED : March 2, 2004
INVENTOR(S) : Chikafumi Yokoyama Page 1 of 1

It is certified that error appears in the above-identified patent and that said Letters Patent is hereby corrected as shown below:

Column 1
Line 56, Delete "bums" and insert -- burns --, therefor.

Column 6
Line 44, Delete ",he" and insert -- the --, therefor.

Signed and Sealed this

Twenty-ninth Day of January, 2008

JON W. DUDAS
*Director of the United States Patent and Trademark Office*